US009435249B2

(12) United States Patent
Ruby et al.

(10) Patent No.: US 9,435,249 B2
(45) Date of Patent: Sep. 6, 2016

(54) METHOD FOR MANAGING A POWER TRAIN IMPLEMENTING AN ESTIMATION OF THE ENGINE TEMPERATURE AT THE END OF A STOP TIME OF AN ELEMENT OF THE POWER TRAIN

(71) Applicant: RENAULT s.a.s., Boulogne-Billancourt (FR)

(72) Inventors: Stephane Ruby, Rueil Malmaison (FR); Jean-Pierre Le-Lagadec, Puteaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/648,750

(22) PCT Filed: Dec. 5, 2013

(86) PCT No.: PCT/EP2013/075610
§ 371 (c)(1),
(2) Date: Jun. 1, 2015

(87) PCT Pub. No.: WO2014/090671
PCT Pub. Date: Jun. 19, 2014

(65) Prior Publication Data

US 2015/0300239 A1 Oct. 22, 2015

(30) Foreign Application Priority Data

Dec. 11, 2012 (FR) ..................................... 12 61863

(51) Int. Cl.
*G06F 19/00* (2011.01)
*F01P 7/02* (2006.01)
*F01P 11/14* (2006.01)

(52) U.S. Cl.
CPC ................ *F01P 11/14* (2013.01); *G06F 19/00* (2013.01); *F01P 2023/00* (2013.01); *F01P 2023/08* (2013.01); *F01P 2025/13* (2013.01); *F01P 2037/02* (2013.01)

(58) Field of Classification Search
USPC ................ 701/29.1, 99, 29.7, 30.3, 113, 22; 318/471; 123/41.15, 198, 41.05, 41.02; 73/114.68; 374/102, 103, E15.001
See application file for complete search history.

(56) References Cited

U.S. PATENT DOCUMENTS 6,279,390 B1 8/2001 Oka et al.
6,386,022 B1 5/2002 Oka et al.
(Continued)

FOREIGN PATENT DOCUMENTS

JP PCT/JP2008/067264 * 4/2010 .............. B60K 6/48
JP PCT/JP2011/079381 * 9/2014 ............. F01P 7/165
(Continued)

OTHER PUBLICATIONS

Design and Fabrication of Heat Storage Thermoelectric Harvesting Devices; Kiziroglou, M.E.; Wright, S.W.; Toh, T.T.; Mitcheson, P.D.; Becker, T.; Yeatman, E.M.; Industrial Electronics, IEEE Transactions on; Year: 2014, vol. 61, Issue: 1; pp. 302-309, DOI: 10.1109/TIE.2013.2257140.*
(Continued)

*Primary Examiner* — Cuong H Nguyen
(74) *Attorney, Agent, or Firm* — Oblon, McClelland, Maier & Neustadt, L.L.P.

(57) ABSTRACT

A method for managing a power train of a motor vehicle provided with an engine and an estimator of a temperature at a given point of the engine includes a step of initializing the estimator when the power train is started. The initialization step includes the following steps: defining a stop time of an element of the power train; defining at least one value representative of the ambient air temperature; assessing a thermal parameter of the engine on the basis of the defined stop time and the value representative of the defined ambient air temperature; and initializing the estimator from the assessed thermal parameter.

10 Claims, 3 Drawing Sheets

(56) References Cited

U.S. PATENT DOCUMENTS

| | | | | |
|---|---|---|---|---|
| 6,463,892 | B1 * | 10/2002 | Russell | F01P 11/14 123/198 D |
| 6,718,256 | B1 | 4/2004 | Holmes et al. | |
| 7,663,502 | B2 * | 2/2010 | Breed | B60C 11/24 340/12.25 |
| 8,036,818 | B2 * | 10/2011 | Kasai | F02D 9/1065 123/399 |
| 8,346,421 | B2 * | 1/2013 | Bryan | B60K 6/445 180/65.1 |
| 8,428,805 | B2 * | 4/2013 | Bailey | B60K 6/46 180/65.31 |
| 8,972,148 | B2 * | 3/2015 | Nawata | B60K 6/445 180/65.21 |
| 2002/0088274 | A1 | 7/2002 | Oka et al. | |
| 2003/0131659 | A1 | 7/2003 | Oka et al. | |
| 2004/0168510 | A1 | 9/2004 | Wakahara et al. | |
| 2005/0046584 | A1 * | 3/2005 | Breed | B60C 11/24 340/13.31 |
| 2005/0087152 | A1 | 4/2005 | Wakahara et al. | |
| 2005/0097946 | A1 | 5/2005 | Wakahara et al. | |
| 2005/0102093 | A1 | 5/2005 | Wakahara et al. | |
| 2005/0228577 | A1 | 10/2005 | Wakahara et al. | |
| 2006/0217857 | A1 | 9/2006 | Yoshida et al. | |
| 2007/0033998 | A1 | 2/2007 | Wakahara et al. | |
| 2007/0175415 | A1 | 8/2007 | Rizoulis et al. | |
| 2008/0202452 | A1 | 8/2008 | Wakahara et al. | |
| 2010/0256892 | A1 | 10/2010 | Shartzer et al. | |
| 2011/0098883 | A1 | 4/2011 | Eser et al. | |
| 2012/0116648 | A1 * | 5/2012 | Russ | 701/102 |
| 2013/0144473 | A1 * | 6/2013 | Jeong | B60W 50/0205 701/22 |
| 2013/0255600 | A1 * | 10/2013 | Teraya | B60K 6/445 123/41.02 |
| 2014/0109846 | A1 * | 4/2014 | Styles | F01P 7/04 123/41.12 |
| 2014/0296025 | A1 * | 10/2014 | Fushiki | F02N 11/006 477/3 |
| 2015/0027387 | A1 * | 1/2015 | Ohashi | F01P 7/165 123/41.02 |
| 2015/0046060 | A1 * | 2/2015 | Nikovski | B60R 16/037 701/99 |
| 2015/0046076 | A1 * | 2/2015 | Costello | G01C 21/3469 701/118 |
| 2015/0300239 | A1 * | 10/2015 | Ruby | F01P 11/14 701/99 |
| 2016/0009314 | A1 * | 1/2016 | Muramatsu | B60W 10/04 701/41 |
| 2016/0052508 | A1 * | 2/2016 | Teraya | B60W 20/16 701/22 |

FOREIGN PATENT DOCUMENTS

| | | | | |
|---|---|---|---|---|
| WO | WO2009/066509 | * | 5/2009 | B60K 6/48 |
| WO | WO2010/004184 | * | 1/2010 | F01P 3/02 |

OTHER PUBLICATIONS

Increasingly correct message passing algorithms for heat source detection in sensor networks; Plarre, K.; Kumar, P.R.; Seidman, T. Sensor and Ad Hoc Communications and Networks, 2004. IEEE SECON 2004. 2004 First Annual IEEE Communications Society Conference on; Year: 2004; pp. 470-479, DOI: 10.1109/SAHCN.2004.1381949.*

Safety and Safety Factors: The impact on heat tracing system designs; Driscoll, T.; Johnson, B.; PCIC Europe, 2009. PCIC Europe '09. Conference Record; Year: 2009; pp. 113-117.*

Analysis of the main factors influencing the energy consumption of electric vehicles; Zoulficar Younes; Laurence Boudet; Frédéric Suard; Mathias Gérard; Roland Rioux; Electric Machines & Drives Conference (IEMDC), 2013 IEEE International Year: 2013; pp. 247-253, DOI: 10.1109/IEMDC.2013.6556260.*

A model-based temperature estimator for improving sensor dynamics in vehicle exhaust systems; Thomas Güther; Holger Bönicke; Christoph Ament; Silke Augustin; Thomas Fröhlich; Industrial Electronics Society, IECON 2013—39th Annual Conference of the IEEE; Year: 2013; pp. 3852-3857, DOI: 10.1109/IECON.2013.6699750.*

Thermal regulation as control reference in electric drives; G. Lo Calzo; A. Lidozzi; L. Solero; F. Crescimbini; V. Cardi Power Electronics and Motion Control Conference (EPE/PEMC), 2012 15th International; Year: 2012; pp. DS2c.18-1-DS2c.18-7, DOI: 10.1109/EPEPEMC.2012.6397302.*

A review of the thermal performance of electric vehicles; Aisling Doyle; Tariq Muneer; Ian Smith; Transportation Electrification Conference (ITEC), 2015 IEEE International; Year: 2015; pp. 1-5, DOI: 10.1109/ITEC-India.2015.7386922.*

International Search Report issued Jan. 20, 2014, in PCT/EP2013/075610, filed Dec. 5, 2013.

French Preliminary Search Report issued May 15, 2013, in Patent Application No. FR 1261863, filed Dec. 11, 2012 (with English Translation of Category of Cited Documents).

* cited by examiner

METHOD FOR MANAGING A POWER TRAIN IMPLEMENTING AN ESTIMATION OF THE ENGINE TEMPERATURE AT THE END OF A STOP TIME OF AN ELEMENT OF THE POWER TRAIN

TECHNICAL FIELD OF THE INVENTION

The invention relates to the field of the motor vehicle.

The invention more particularly relates to a method for managing a power train of a motor vehicle, which is provided with an engine and an estimator of a temperature at a specific location of the engine.

PRIOR ART

In a power train, the engine, in particular a heat engine, is generally cooled in order to preserve its cylinder head. This is because the cylinder head comprises different specific locations, which are also called "meltable zones" which are liable to deteriorate if these specific locations exceed a predetermined temperature. The control of the temperature of these specific locations is therefore important so as to implement adequate cooling of the engine.

The power train may be provided with an estimator whose function is to estimate the temperature in the region of these specific locations in order to implement an appropriate cooling strategy.

When the power train starts up, there is the problem of initialization of the estimator at a suitable initialization temperature in order to facilitate the monitoring of a specific location. The initialization temperature is a fixed value which is selected in order to overestimate the actual temperature of the specific location in order not to damage the engine. It should be understood that this overestimation does not allow the cooling strategy to be optimized, or any other strategy which is intended to be implemented when a vehicle is started and which may require knowledge of the temperature of the engine at this time.

OBJECT OF THE INVENTION

An object of the present invention is to provide a solution which overcomes the disadvantages set out above.

This object is achieved in particular as a result of a method for managing a power train of a motor vehicle which is provided with an engine and an estimator of a temperature at a specific location of the engine, and in that it comprises a step of initialization of the estimator which is carried out when the power train starts, the initialization step comprising the following steps: determining a stop time of an element of the power train; determining at least one value which is representative of the temperature of the ambient air; evaluating a thermal parameter of the engine in accordance with the stop time determined and the determined value which is representative of the temperature of the ambient air; initializing the estimator based on the thermal parameter evaluated.

Advantageously, the thermal parameter evaluated is an evaluated temperature of the specific location of the engine.

Preferably, the step of evaluating the thermal parameter comprises a step of determining at least one temperature of the engine at the time at which the stop time of the element of the power train begins, and/or a step of determining at least one value which is representative of the temperature of the ambient air at the time at which the stop time of the element of the drive train begins.

According to an embodiment, the step of determining at least one value which is representative of the temperature of the ambient air of the initialization step comprises a step of measuring the temperature which is representative of the temperature of the ambient air via a temperature sensor of intake air of the engine and/or a step of measuring the temperature which is representative of the temperature of the ambient air via a temperature sensor in the region of the outer side of the vehicle.

Preferably, the step of evaluating the thermal parameter of the engine comprises a step of simulating the development of the temperature of the engine during the stop time, the simulation step taking into account a thermal flow which is supplied to the engine via its operation at zero value, and determining a dissipated thermal flow of the engine via the cooling thereof.

According to a development, the simulation step comprises a step of determining the development of the temperature of the ambient air during the stop time.

Advantageously, the dissipated thermal flow $ø_s(t)$ of the engine at the time t is determined from the following equation: $ø_s(t)=h(t)\cdot S\cdot(T°\ \text{engine}(t)-T°\ \text{ext}(t))$, where h(t) is the thermal exchange coefficient between the engine and the air below a hood of the vehicle at the time t, S the exchange surface between the engine (1) and the air below the hood, T° engine(t) the temperature of the engine at the time t, T° ext(t) the temperature of the ambient air at the time t.

Furthermore, since the estimator is configured so as to estimate over time temperatures which are associated with different specific locations of the engine, respectively, the step of evaluating the thermal parameter may be carried out so as to evaluate a temperature for each specific location of the engine in order to initialize the estimator with an initialization temperature for each specific location of the engine.

According to an embodiment, the method successively comprises the initialization step, a step of estimating the temperature of the specific location of the engine using the initialized estimator, and a step of controlling the cooling circuit which is configured so as to limit the cooling of the specific location of the engine if the estimated temperature of the specific location is below a predetermined threshold and/or for a predetermined period of time.

The invention also relates to a device comprising hardware and/or software elements for implementing the method as described and the hardware and/or software elements for implementing the method comprise: an element for determining a stop time of an element of the drive train; an element for determining at least one value which is representative of the temperature of the ambient air; an element for evaluating a thermal parameter of the engine in accordance with the stop time determined and the determined value which is representative of the temperature of the ambient air; an element for initializing the estimator based on the thermal parameter evaluated.

BRIEF DESCRIPTION OF THE DRAWINGS

Other advantages and features will be appreciated more clearly from the following description of specific embodiments of the invention which are given by way of non-limiting example and which are illustrated in the appended drawings, in which.

DESCRIPTION OF PREFERRED EMBODIMENTS OF THE INVENTION

The method described below differs from the prior art in particular in that it will allow an estimator to be initialized taking into account at least one thermal parameter of the engine, in particular a temperature which is closest to reality.

Figure 1:
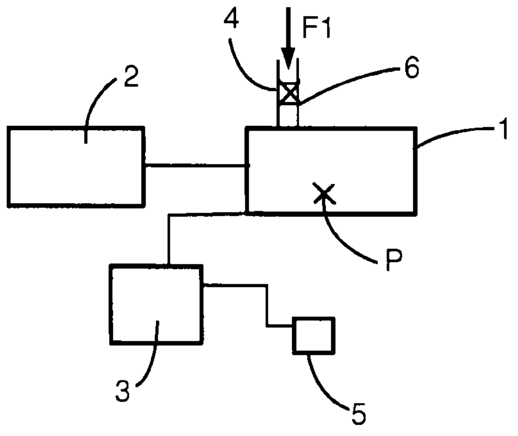
FIG. 1 is a schematic view of a specific embodiment of a drive train which is intended to be used in the context of the present invention.

The drive train of the motor vehicle as illustrated in FIG. 1 is provided with an engine 1 and an estimator 2 of a temperature at a specific location P of the engine 1.

Figure 2:
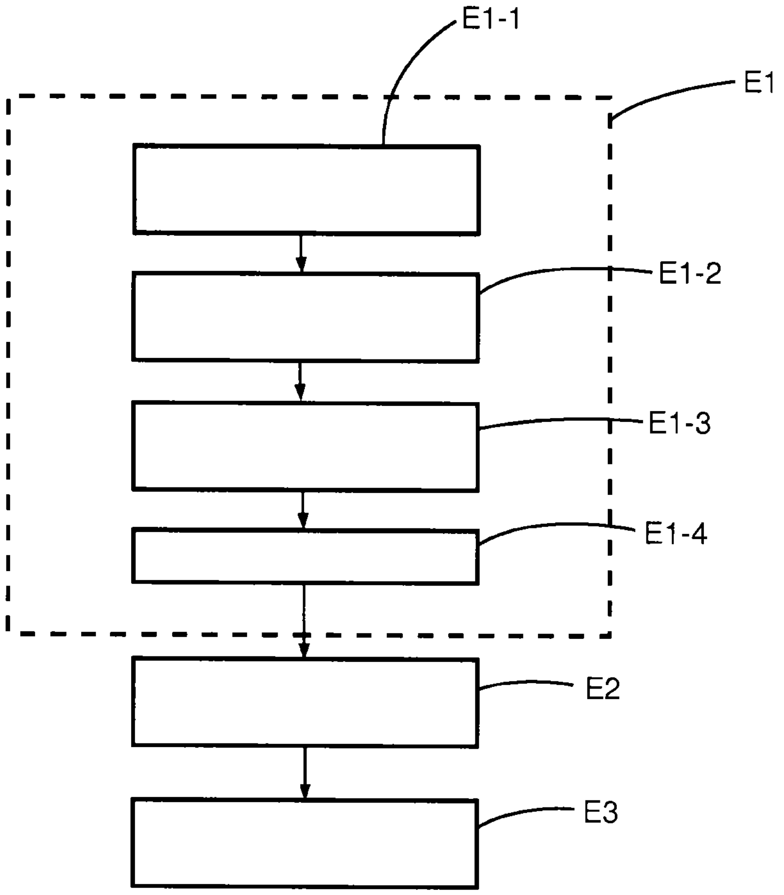
FIG. 2 is a schematic view of a method according to an embodiment of the invention.

FIG. 2 illustrates a method for managing such a drive train, the method comprising a step E1 of initializing the estimator 2 which is carried out when the drive train starts up. The initialization step E1 comprises a step E1-1 of determining a stop time of an element of the drive train.

The term "start up of the drive train" is intended to be understood to mean that a driver of the vehicle whose engine is stopped switches on the ignition in order to start the vehicle following a stop phase of the vehicle, for example, in a parking space.

The intended element for which it is desirable to determine the stop time may be the engine 1, a supervision processor 3 of the drive train, etcetera.

Preferably, the element of the drive train is the supervision processor 3. This is because, when the driver switches off the engine, the processor 3 remains active for a few seconds (for example, some tens of seconds), this time of stopping activity is also referred to as a "power latch" in the sector. During the time of stopping activity, the processor continues to use the estimator 2 in order to calculate the effective temperature at the specific location of the engine. At the end of the time of stopping activity, the estimator 2 switches off.

In this manner, during a restart operation, it is desirable to initialize the estimator 2, preferably with a temperature close to that of the specific location P of the engine at the time of the restart. Preferably, this initialization temperature is that of the engine, for example, at the specific location P, just before the start-up of the engine.

The method further comprises a step E1-2 of determining at least one value which is representative of the temperature of the ambient air. This step E1-2 which belongs to the initialization step E1 may comprise a step of measuring the temperature which is representative of the temperature of the ambient air via a sensor 4 of the temperature of the intake air of the engine 1 and/or a step of measuring a temperature which is representative of the temperature of the ambient air via a temperature sensor 5 in the region of the outer side of the vehicle. The temperature sensor 4 of the intake air is generally located in the intake collector 6 of the engine 1. The temperature sensor 5 in the region of the outer side of the vehicle may itself be located on a rear-view mirror of the vehicle. These two sensors 5 and 6 may be connected to the processor 3 which is intended to acquire the signals thereof. These measurements are representative of the actual temperature at the time at which the stop time ends, that is to say, at the time at which the restart operation begins.

The term "temperature of the ambient air" is intended to be understood to mean the air surrounding the vehicle. It may therefore be the outer air with respect to the vehicle.

Furthermore, the initialization step E1 of the method comprises a step E1-3 of evaluation of a thermal parameter of the engine 1 in accordance with the stop time determined and the determined value which is representative of the temperature of the ambient air. Finally, the initialization step E1 of the method comprises an initialization step E1-4 of the estimator 2 based on the thermal parameter evaluated.

Preferably, the thermal parameter evaluated is an evaluated temperature of the specific location of the engine 1, in particular at the time at which the stop time ends. This evaluated thermal parameter will therefore be able to act as an initialization temperature of the estimator 2.

In fact, the evaluation step E1-3 enables the determination of the value at which the thermal parameter would have to be at the end of the stop time of the element of the drive train. This evaluation step E1-3 may be implemented by the estimator 2, more specifically by calculation means of the estimator 2, before the initialization thereof at the initialization step E1-4.

To this end, it is possible to store engine temperature and ambient air temperature values which have been determined/measured when the engine is stopped or when the stop time begins, these values being able to be subsequently recovered, in particular from a store, in order to carry out the evaluation step. In this manner, the evaluation step E1-3 of the thermal parameter preferably comprises a step of determining at least one temperature of the engine 1 at the time at which the stop time of the drive train element begins (this determination step can thus be implemented by a step of recovering the at least one temperature of the engine 1 at the time at which the stop time of the drive train element begins, which temperature is stored in a store) and/or a step of determining at least one value which is representative of the temperature of the ambient air at the time at which the stop time of the drive train element begins (this determination step can thus be implemented by a step of recovering the at least one value which is representative of the temperature of the ambient air at the time at which the stop time of the drive train element starts, which value is stored in a store). The determined temperature of the engine 1 at the time at which the stop time begins may be the last temperature of the engine (for example, of the specific location) estimated by the estimator 2 before the stoppage of the drive train element. The determined temperature of the ambient air at the time at which the stop time of the drive train element begins may be the last temperature of the ambient air measured (for example, by the sensors) before the stoppage of the drive train element.

Consequently, knowing the ambient temperature at the time at which the stop time begins, the ambient temperature at the time at which the stop time ends, and the temperature of the engine 1 at the time at which the stop time of the drive train element starts, it is possible to approximate in a precise manner a value of the temperature of the engine (in particular in the region of the specific location) at the time at which the drive train starts up.

That is to say, generally, the step E1-3 of evaluation of the thermal parameter of the engine 1 may comprise a step of simulating the development of the temperature of the engine 1 (in particular in the region of the specific location) during the stop time, the simulation step taking into account a thermal flow which is brought to the engine 1 by the operation thereof at a value of zero, and which determines a dissipated thermal flow of the engine 1 via the cooling thereof. With these data and conditions, the estimator 2 can carry out, after the stop time, a simulation of the development of the temperature of the specific location P of the engine 1 for the entire duration of the stop time of the drive train element. The equations which allow this simulation to be carried out may be the same as those used in real time during the operation of the engine 1, consequently the estimator itself can calculate the value of the thermal parameter with which it will be initialized. The time step of the simulation may be in the order of a second. That is to say, the estimator 2 will simulate in a very short time the theoretical value of the thermal parameter for each second of the stop time in order to obtain at the end of the stop time a theoretical value of the thermal parameter close to the real value.

In the present description, the thermal flow supplied to the engine may also be considered to be a flow of heat which enters the engine, and the dissipated thermal flow may be considered to be a flow of heat which is discharged from the engine.

In fact, during the step E1-3, the thermal flow supplied to the engine 1 by the operation thereof is considered to be zero since the engine is in the stop state. In this manner, the temperature of the engine 1 will progressively fall by means of discharge of heat accumulated by the engine 1 as a result of a heat exchange, in particular with the surrounding air of the engine 1.

Furthermore, in order to simulate in the best possible manner the development of the temperature of the engine 1, the simulation step may comprise a step of determining the development of the temperature of the ambient air during the stop time. This approximation of the development of the temperature of the ambient air may be carried out based on the ambient temperature at the start of the stop time and the ambient temperature at the end of the stop time (these values being able to be those determined above, and in particular stored in a store). For example, the approximation is carried out by means of linear approximation, or by means of exponential approximation (for example, by means of exponential decrease taking into account that, during the stop time, the temperature decreases), or by means of calculation of a mean between the ambient temperature at the beginning of the stop time and the ambient temperature at the end of the stop time. Such approximations and calculations are well known to the person skilled in the art and will not all be set out in detail here. By way of non-limiting example, an approximated temperature Tapp, at the time t, between t1 and t2 defining the stop time (t1 being the time at which the stop time begins and t2 being the time at which the stop time ends), may be approximated from the following formula:

$$Tapp(t)=Tair(t1)+(t+t1)*((Tair(t2)-Tair(t1))/(t2-t1)), \quad \text{equation (1)}$$

where Tair(t1) and Tair(t2) are the actual values of the temperature of the ambient air at t1 and t2, for example, measured at these times t1 and t2.

According to a specific embodiment, the dissipated thermal flow $\varnothing_s(t)$ of the engine at the time t is determined from the following equation:

$$\varnothing_s(t)=h(t)\cdot S\cdot(T^\circ\ \text{engine}(t)-T^\circ\ \text{ext}(t)), \quad \text{equation (2)}$$

where h(t) is the thermal exchange coefficient between the engine (for example, considered to be a metal mass) and the air below a hood of the vehicle at the time t, S the exchange surface between the engine 1 and the air below the hood, T° engine(t) the temperature of the engine 1 (in particular of the metal mass thereof) at the time t, T° ext(t) the temperature of the ambient air at the time t. The hood of the engine is generally formed by a bodywork member which protects the access of the engine at the front or at the rear of the vehicle. During the step E1-3, T° ext at the time t originates from the approximation described above.

In the event that the engine is stopped, that is to say, in order to calculate $\varnothing_s(t)$ during the stop time, h(t) is associated with the natural convection coefficient air/metal with air.

After the estimator 2 has been initialized, it will be able to be used in order to determine the temperature at a specific location P of the engine 1, in particular taking into account the operation of the engine 1, in order to optimize the increase in temperature of the engine 1. This optimization advantageously enables the emissions of pollutants to be reduced, for example, by promoting the chemical reactions in devices for post-processing of the exhaust gases of the engine. This optimization also enables the fuel consumption of the engine to be reduced, for example, by increasing the speed of the temperature increase of the engine, which allows the occurrences of engine friction to be reduced. This optimization may where applicable also enable, in particular in diesel engines, the cold operating noise of the engine to be reduced.

In this manner, the method may comprise in succession the step E1 of initialization of the estimator 2, a step E2 of estimation by the initialized estimator 2 of the temperature of the specific location P of the engine 1 and a step E3 of controlling the cooling circuit which is configured so as to limit the cooling of the specific location P of the engine 1 if the estimated temperature of the specific location P is below a predetermined threshold and/or for a predetermined period of time. That is to say, the control step E3 allows the different elements of the cooling circuit to be controlled in order to reach the nominal operating temperature of the engine as quickly as possible.

During the step E2, the engine is started; this involves the operation thereof bringing about a supply of heat in particular as a result of the combustion of the fuel of the engine.

Figure 3:
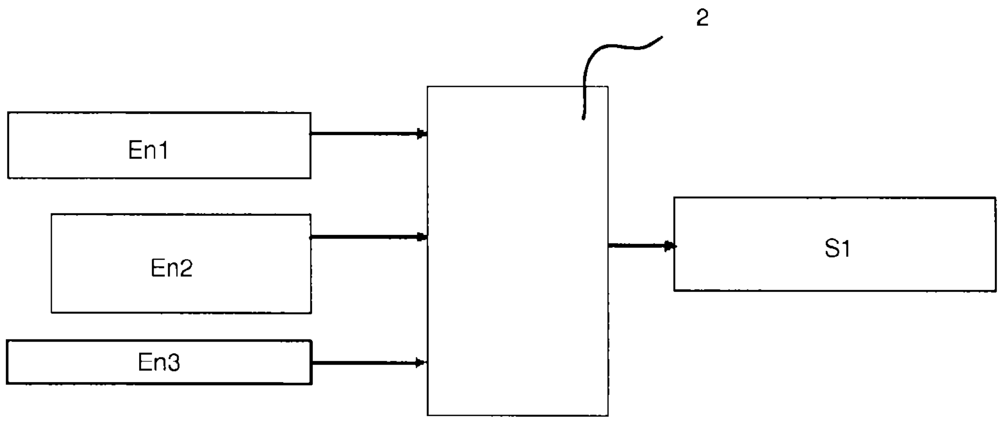
FIG. 3 illustrates an estimator which is configured to provide a temperature estimation at a specific location of an engine.

FIG. 3 sets out a specific embodiment of the estimation of this temperature of the specific location P using the initialized estimator 2. For example, the estimator 2 comprises at least three inputs and an output. The three inputs allow the estimator to be supplied with the following data: the parameters of the vehicle En1 (for example, the engine speed and/or the engine load and/or the speed of the vehicle), the ambient temperature En2, and the initialization temperature En3 (that is to say, the thermal parameter evaluated). At the output S1, the estimator 2 provides an estimation of the temperature in the region of the specific location P of the engine 1.

Preferably, after the step E3 has been implemented, the predetermined threshold will be used to verify whether this control step E3 has to be stopped or continued. The use of this threshold in order to process the implementation time of the control step E3 is preferred since it enables a gain in terms of consumption of the drive train in the sense that the cooling by a cooler is limited to the strict requirements of the engine (in contrast to the "standard" operation, where the cooler is always at a maximum, for a specific engine speed, regardless of the requirements of the engine). The limitation of the cooling to the strict requirements of the engine also allows the engine to increase more rapidly in terms of temperature, resulting in a reduction of the occurrences of friction and gains in terms of fuel consumption and polluting emissions.

According to a specific embodiment, the step E2 of estimating the temperature of the specific location P may comprise the following steps:

determining a thermal flow (for example, heat) supplied to the engine 1 in the region of the specific location P as a result of the operation of the engine in accordance with the evaluated thermal parameter (the thermal parameter is preferably used only to initialize the estimator when the engine is restarted; once the engine is turning, it is no longer used), and determining a dissipated thermal flow (for example, heat) of the engine 1 in the region of the specific location P. The dissipated thermal flow of the engine may be determined in accordance with the formula of the equation (2) above. In this instance, since the engine is turning (that is to say, producing a succession of steps of combustion of a fuel), the coefficient h(t) may be determined (by means of calculation or by means of reading in a table) from an operation location of the vehicle (engine speed and/or engine load and/or speed of the vehicle, etcetera). Furthermore, in the case of the estimation of the turning engine, the ambient temperature is provided continuously at the input of the equation (2), in particular by the sensors set out above.

Furthermore, the determination of the thermal flow supplied to the engine and the determination of the dissipated thermal flow of the engine may each implement a step of estimating these flows from reading data in tables produced from measurements and/or simulations carried out during a calibration of the operation of the drive train of the vehicle. For example, they may be determined from a table taking as the input: the engine and vehicle parameters (for example, the engine speed and/or the engine load, and/or the speed of the vehicle, etcetera); one or more temperatures calculated by the estimator, in particular in the region of the specific location; and a temperature of the air outside the engine.

Preferably, after a first estimation of the temperature of the specific location from the evaluated thermal parameter which has initialized the estimator 2, the estimator 2 estimates on a cyclical basis the temperature in the region of the specific location P, in particular from the following formula:

$$F_{supply}-F_{discharge}=Mn\times Cp\times \mathrm{Delta}T, \quad \text{equation (3)}$$

where $F_{supply}$ is the thermal flow supplied, $F_{discharge}$ the dissipated thermal flow, Mn the thermal inertia in the region of the specific location, Cp the heat capacity in the region of the specific location P, and DeltaT the variation of temperature in the region of the specific location P, in order to verify whether the step E3 which is configured in order to limit the cooling of the engine 1 has to be continued.

Generally, engines, in particular heat engines, are cooled by a cooling fluid which circulates as close as possible to the zones of the engine to be cooled. In this manner, the step E3 which is configured so as to limit the cooling of the engine 1 preferably implements a step of stopping or limiting the circulation of a cooling fluid of the engine 1.

According to an embodiment, the estimator 2 is configured so as to estimate over time temperatures which are associated with different specific locations P of the engine 1, respectively. Preferably, the step E1-3 of evaluation of the thermal parameter is carried out in order to evaluate a temperature for each specific location P of the engine 1 in order to initialize the estimator 2 with an initialization temperature for each specific location of the engine 1. Of course, it is also possible to initialize the estimator 2 with a single thermal parameter value, the estimator 2 then being capable of extrapolating from this single thermal parameter value estimates of temperatures at the different specific locations P of the engine 1.

Figure 4:
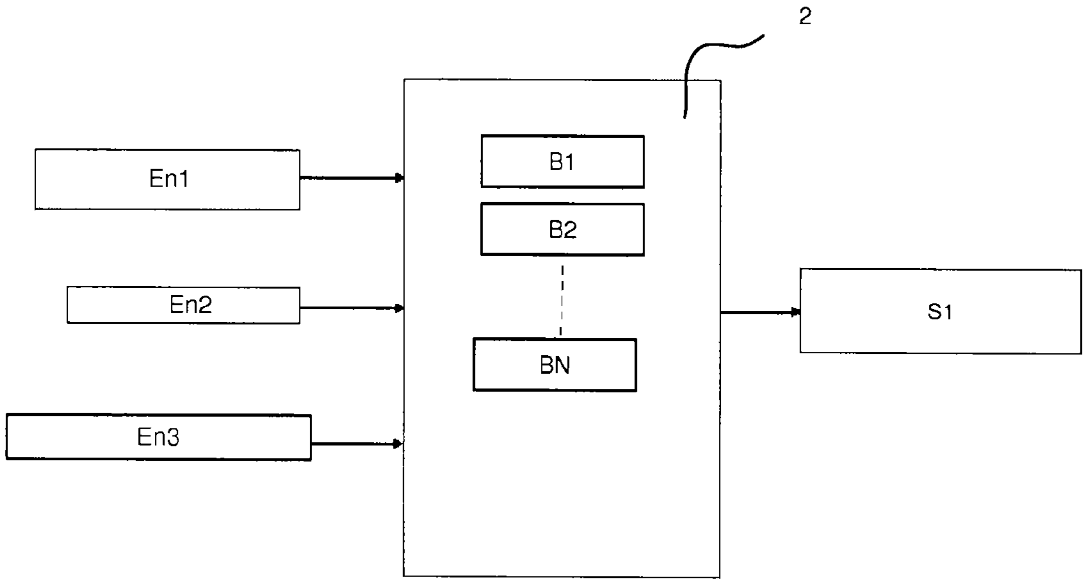
FIG. 4 illustrates an estimator which is configured to provide a temperature estimation at several specific locations of an engine.

As illustrated in FIG. 4, taking the elements of FIG. 3 again, for each of these specific locations, the estimator 2 may comprise calculation units (B1 to BN). These N calculation units, for N specific locations, are preferably constituted in the same manner. The term "same manner" is intended to be understood to mean the same software architecture and the same equations. In contrast, the parameters, data and tables used may differ from one unit to another.

Figure 5:
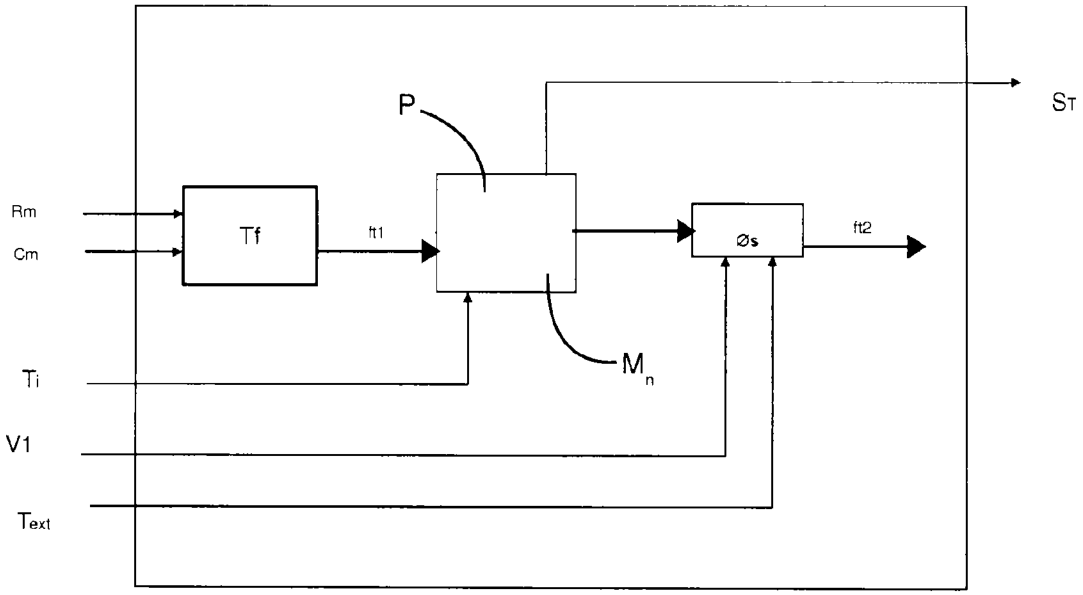
FIG. 5 illustrates a calculation unit of the estimator of FIG. 4.

FIG. 5 illustrates in greater detail a calculation unit. Firstly, an engine speed value Rm and an engine torque value Cm enable from a table of combustion flow Tf (for example, calibrated by tests or by calculations) the determination of the thermal flow ft1 supplied to the engine in the region of the specific location P modeled by a thermal inertia associated with a metal mass Mn which is representative of the specific location P to be monitored. The value of this metal mass Mn may be determined by means of tests or by means of calculation. The dissipated thermal flow $ø_s$ of the thermal inertia (represented in this instance ft2) is calculated at any time, in particular by means of the equation (2) described above. In the example of FIG. 5, the coefficient h(t) varies in accordance with the speed, that is to say, this coefficient may be determined from a table which takes as the input the speed value of the vehicle V1 and which provides as the output h(t). At the first launch of the estimation of the temperature of the specific location P associated with the calculation unit, the temperature of the thermal inertia is placed at the evaluated temperature Ti during the initialization phase. Then, for future estimations, the equation (3) described above is used. In this manner, at any time, a processor of the engine can estimate the temperature $S_T$ in the region of the specific location N to be monitored which therefore corresponds to the temperature in the region of the thermal inertia $M_N$. This temperature may then be compared (outside the "estimator") at any time with the reliability threshold(s) of the corresponding engine at the location N. According to the above description, the calculation can be carried out "at any time". In fact, it may also be carried out not continuously, but instead periodically every Δt (and in general this is what is carried out in reality by the supervision processor 3 of the drive train), with Δt=x seconds or fractions of seconds, x may or may not be constant and is typically between 0.01 sec and 1 sec inclusive, preferably x is equal to 0.1 sec. The calculation may also be carried out for every y revolutions of the engine, y being included between 0.5 and 50 revolutions of the engine, and preferably y is equal to 1 revolution of the engine.

Generally, the specific locations P are locations which are associated with "meltable" zones of the cylinder head of an engine 1; it is therefore preferable to know their temperatures in order to act in an appropriate manner on the cooling of the engine 1 and thus to prevent the occurrence of irreparable damage to the engine 1 of the drive train.

The method described above enables the temperature when the engine 1 is started to be estimated in the best possible manner without using specific sensors (for example, located at the specific locations P of the engine 1 in order to directly measure the temperature thereof) or additional sensors compared with the current technical definition of the vehicles. To this end, the joint use of the on-board clock in order to measure the time elapsed (stop time) and one or two air temperature sensor(s) (rear-view mirror and/or in the engine via a flow meter air temperature sensor) in order to know the ambient temperature enables the method as described to be implemented at least partially.

That is to say, the estimator 2 is initialized with temperatures which are true to reality as soon as the drive train is restarted. This improves the precision, therefore also the gains in terms of polluting emissions compared with the prior art.

Furthermore, the method may be implemented using components which are already present in a motor vehicle. In this manner, it is simple to implement and does not involve any significant additional cost.

In the event of a malfunction of the clock on-board the vehicle used to determine the stop time, at least one fixed temperature will be selected to initialize the estimator 2. This fixed temperature is selected in order to overestimate the temperature of the associated specific location in order to protect it.

The invention also relates to a data recording medium which can be read by a processor, on which a data-processing program is recorded which comprises data-processing program encoding means for implementing the steps of the method as described.

Furthermore, a data-processing program may comprise a data-processing program encoding means which is capable of carrying out the steps of the method as described when the program is carried out by a processor, in particular the supervision processor 3 set out above.

In order to implement the method, a device may comprise hardware and/or software elements for implementing the method. More specifically, these hardware and/or software elements for implementing the method may comprise: an element for determining a stop time of an element of the drive train; an element for determining at least one value which is representative of the temperature of the ambient air; an element for evaluating a thermal parameter of the engine in accordance with the stop time determined and the determined value which is representative of the temperature of the ambient air; and an element for initializing the estimator based on the thermal parameter evaluated. These different elements may be controlled by a processor, in particular the supervision processor 3, in order to implement the method.

A motor vehicle may comprise a processor which is configured so as to implement the method as described and/or the device set out above, which is interfaced with the processor.

The invention claimed is:

1. A method for managing a power train of a motor vehicle, which is provided with an engine and an estimator of a temperature at a specific location of the engine, comprising:

- initializing the estimator when the power train starts, the initializing comprising:
  - determining a stop time of an element of the power train,
  - determining a temperature of ambient air when the stop time begins,
  - determining at least one temperature of the engine when the stop time begins,
  - determining a temperature of the ambient air when the stop time ends,
  - evaluating a thermal parameter of the engine in accordance with the stop time determined, the temperature of the ambient air when the stop time begins, the temperature of the engine when the stop time begins, and the temperature of the ambient air when the stop time ends, and
  - initializing the estimator based on the thermal parameter evaluated;
- estimating the temperature of the specific location of the engine using the initialized estimator; and
- controlling a cooling circuit of the motor vehicle to limit cooling of the specific location of the engine when the estimated temperature of the specific location is below a predetermined threshold or for a predetermined period of time.

2. The method as claimed in claim 1, wherein the thermal parameter evaluated is an evaluated temperature of the specific location of the engine.

3. The method as claimed in claim 1, wherein the specific location of the engine is in a cylinder head of the engine.

4. The method as claimed in claim 1, wherein the determining the temperature of the ambient air comprises measuring via a temperature sensor of intake air of the engine and/or measuring via a temperature sensor in a region of an outer side of the vehicle.

5. The method as claimed in claim 1, wherein the evaluating the thermal parameter of the engine comprises simulating a development of the temperature of the engine during the stop time, the simulating taking into account a thermal flow which is supplied to the engine via engine operation at zero value, and determining a dissipated thermal flow of the engine via the cooling thereof.

6. The method as claimed in claim 5, wherein the simulating comprises determining a development of the temperature of the ambient air during the stop time.

7. The method as claimed in claim 5, wherein the thermal flow is a dissipated thermal flow $ø_s(t)$ of the engine at a time t and is determined from the following equation: $ø_s(t)=h(t)\cdot S\cdot(T°\text{ engine}(t)-T°\text{ ext}(t))$, where h(t) is a thermal exchange coefficient between the engine and air below a hood of the vehicle at the time t, S is an exchange surface between the engine and the air below the hood, T° engine(t) is the temperature of the engine at the time t, T° ext(t) is the temperature of the ambient air at the time t.

8. The method as claimed in claim 1, wherein, since the estimator is configured so as to estimate over time temperatures which are associated with different specific locations of the engine, respectively, the evaluating the thermal parameter is carried out so as to evaluate a temperature for each specific location of the engine in order to initialize the estimator with an initialization temperature for each specific location of the engine.

9. The method as claimed in claim 1, wherein the determining the temperature of the engine when the stop time begins is performed after the engine is switched off and before a processor that performs the determining is switched off.

10. A device for implementing the method as claimed in claim 1, the device comprising:

- a processor comprising:
  - an element configured to determine a stop time of an element of the power train,
  - an element configured to determine a temperature of the ambient air when the stop time begins,
  - an element configured to determine at least one temperature of the engine when the stop time begins,
  - an element configured to determine a temperature of the ambient air when the stop time ends,
  - an element configured to evaluate a thermal parameter of the engine in accordance with the stop time determined, the temperature of the ambient air when the stop time begins, the temperature of the engine when the stop time begins, and the temperature of the ambient air when the stop time ends, and
  - an element for configured to initialize the estimator based on the thermal parameter evaluated.

* * * * *